(12) United States Patent
Lee et al.

(10) Patent No.: US 9,116,242 B2
(45) Date of Patent: Aug. 25, 2015

(54) MAP AWARE ADAPTIVE AUTOMOTIVE RADAR

(71) Applicants: Toyota Motor Engineering & Manufacturing North America, Inc., Erlanger, KY (US); Michigan Technological University, Houghton, MI (US)

(72) Inventors: Jae Seung Lee, Ann Arbor, MI (US); Nikola Stevan Subotic, Ann Arbor, MI (US); James Paul Ebling, Ann Arbor, MI (US); Helen Kourous Harrigan, Monroe, MI (US)

(73) Assignees: Toyota Motor Engineering & Manufacturing North America, Inc., Erlanger, KY (US); Michigan Technological University, Houghton, MI (US)

( * ) Notice: Subject to any disclaimer, the term of this patent is extended or adjusted under 35 U.S.C. 154(b) by 234 days.

(21) Appl. No.: 13/787,092

(22) Filed: Mar. 6, 2013

(65) Prior Publication Data

US 2014/0253364 A1 Sep. 11, 2014

(51) Int. Cl.
*G01S 13/86* (2006.01)
*G01S 13/93* (2006.01)
*G01S 13/00* (2006.01)

(52) U.S. Cl.
CPC .............. *G01S 13/931* (2013.01); *G01S 13/86* (2013.01)

(58) Field of Classification Search
CPC ........ G01S 13/88; G01S 13/93; G01S 13/931
USPC ............... 342/13, 16–20, 27, 28, 70–72, 73, 342/82–103, 175, 192–197, 52; 701/1, 701/23–36, 400, 408, 409, 514, 522, 300, 701/301
See application file for complete search history.

(56) References Cited

U.S. PATENT DOCUMENTS

| | | | | |
|---|---|---|---|---|
| 6,297,732 | B2 * | 10/2001 | Hsu et al. ........................ | 342/70 |
| 6,853,908 | B2 * | 2/2005 | Andersson et al. ............ | 701/300 |
| 7,400,290 | B2 * | 7/2008 | Woodington et al. ........... | 342/70 |
| 7,576,838 | B2 | 8/2009 | Shirai | |
| 8,269,652 | B2 | 9/2012 | Seder et al. | |
| 8,280,560 | B2 | 10/2012 | Huang et al. | |
| 8,280,601 | B2 | 10/2012 | Huang et al. | |
| 8,457,814 | B2 * | 6/2013 | Hasegawa ..................... | 701/514 |
| 8,611,849 | B2 * | 12/2013 | Snider ............................. | 342/20 |

FOREIGN PATENT DOCUMENTS

JP 2007139594 A 6/2007

* cited by examiner

*Primary Examiner* — Bernarr Gregory
(74) *Attorney, Agent, or Firm* — Gifford, Krass, Sprinkle, Anderson & Citkowski, P.C.

(57) ABSTRACT

A dedicated short range radar system is provided for use with a GPS system. The radar system includes a transmitter which transmits a microwave radio signal. A receiver is coupled to a horizontally scanning receiver antenna array which receives an echo, if present, from the radio signal transmitted by the transmitter. The radio receiver then generates an output signal representative of the echo. A control circuit then receives the output signal from the antenna array as well as the output signal from the GPS system. The control circuit then varies the mode of operation of the receiver and/or the transmitter as a function of the type of roadway for optimal radar performance.

15 Claims, 3 Drawing Sheets

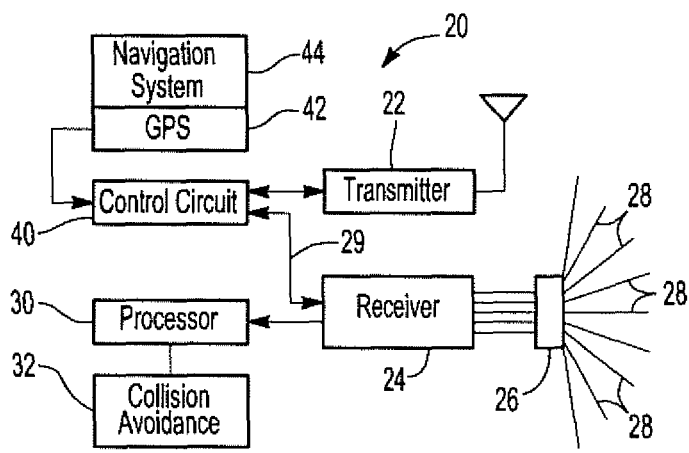
*Fig-1*
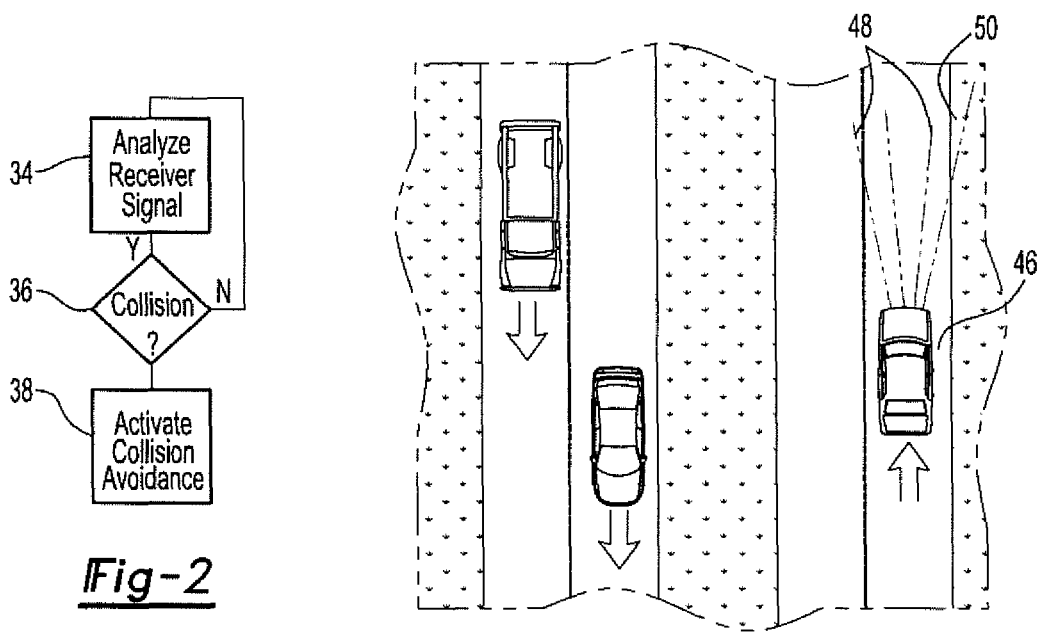
*Fig-2*
*Fig-3*
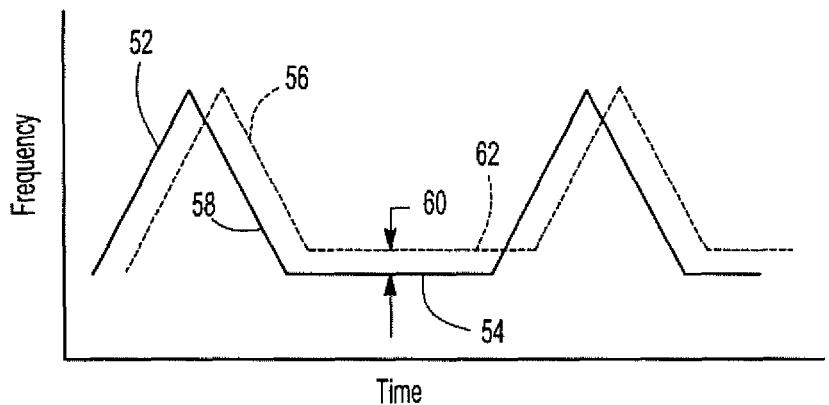
*Fig-4*

MAP AWARE ADAPTIVE AUTOMOTIVE RADAR

BACKGROUND OF THE INVENTION

1. Field of the Invention

The present invention relates generally to radar systems and, more particularly, to an automotive dedicated short range radar system.

2. Description of the Related Art

Dedicated short range radar systems for automotive vehicles have enjoyed increased popularity in the United States and elsewhere. Such automotive radar systems have been allotted bandwidth centered at 76.5 gigahertz in the United States by the federal government. Such automotive radar systems are used primarily, but not exclusively, in collision avoidance systems within the automotive vehicle.

Although there are different types of radar systems, many automotive radar systems utilize a continuous wave frequency modulated (CWFM) radar system. In a CWFM radar system, a transmitter transmits a microwave signal, e.g. at a center frequency of 76.5 gigahertz, so that the transmitted radio signal repeatedly sweeps between two frequencies. In the event that there is an object within the range of the vehicle, the transmitted radio frequency is reflected back as an echo towards the vehicle transmitting the radio signal.

In order to receive the echo from the transmitted signal, a horizontally steerable antenna array is also provided on the vehicle. This horizontally steerable array includes a preset number of horizontal scan positions which are horizontally angularly spaced from each other. For example, an antenna array having 16 horizontal scan positions with the first horizontal position directed to the left side of the vehicle, the central horizontal scan position directed straightforwardly of the vehicle, and the 16$^{th}$ horizontal scan position directed towards the right side of the vehicle. The number of horizontal scan positions, furthermore, determines the resolution of the radar system with a higher number of horizontal scan positions resulting in greater resolution.

One disadvantage of these previously known automotive radar systems, however, is that the radar system operates in a constant mode of operation which is selected or designed as a compromise between the various different types of road conditions that will be encountered by the vehicle. For example, during operation of the vehicle on a divided highway limited access roadway, also known as expressways or freeways, the most important information for the operator of the vehicle is relatively long range radar directed forwardly and towards the right side of the vehicle. Furthermore, during such operation, high resolution of the radar system is not required but the accurate measurement of speed changes between the vehicle and the forward vehicles detected by the radar system is of high importance.

Conversely, in an urban or neighborhood environment, the vehicle as well as other objects around the vehicle moves at a much slower rate so that accurate measurement of the speed difference between the vehicle and the surrounding objects is less important than on a divided highway. However, in an urban or neighborhood roadway it is important to detect objects other than vehicles, such as pedestrians, animals, bicycle riders, and the like. Consequently, a much wider range and higher resolution for the radar system is highly desirable. Furthermore, since some objects, such as pedestrians and animals, reflect a lower power density signal back to the vehicle than an automotive vehicle, it would be advantageous to increase the power of the radar system to ensure detection of such pedestrians, animals, etc.

The previously known automotive radar systems, however, do not adapt their mode of operation as a function of the type of roadway. Consequently, a compromised fixed operation of the radar system has been employed with less than optimal operating results for different operating conditions and different types of roadways.

SUMMARY OF THE PRESENT INVENTION

The present invention provides an automotive radar system which automatically adapts the mode of operation for optimal operation as a function of the type of roadway currently traveled by the automotive vehicle.

In brief, the radar system is used in conjunction with a GPS system which generates an output signal of the type of roadway currently traveled by the automotive vehicle or from which the type of roadway can be determined. The GPS system itself may be either self-contained within the radar system, or may be contained within a navigation system on an automotive vehicle which is coupled to the radar system.

A transmitter transmits a CWFM radio signal which repeatedly sweeps between two different frequencies. A radio receiver is then coupled to a horizontally scanning receiver antenna array which receives an echo, if present, from the radio signal transmitted by the transmitter.

A control circuit then receives the output signal from the receiver as well as the output signal from the GPS system. The control circuit then varies the mode of operation of the receiver and/or transmitter as a function of the type of roadway.

For example, in the event that the vehicle is currently traveling on a multilane divided highway, i.e. a limited access divided roadway, the control system reduces the number of horizontal scan positions of the antenna array to a number of horizontal positions slightly left, facing forwardly, and to the right side of the vehicle since radar information on the far left side of the vehicle, i.e. from oncoming traffic on the opposite side of the divided highway, contains little useful information. In addition, the control system varies the signal transmitted by the transmitter to a sawtooth pattern followed by a tail and this waveform is repeated for each horizontal scan position employed by the antenna array. Such a waveform is highly advantageous for a limited access roadway since it provides accurate range detection as well as accurate measurement of velocity differences, i.e. delta velocity, between the vehicle and vehicles forwardly of the vehicle.

Conversely, in an urban or neighborhood environment where automotive speeds are much lower, a wide range radar resolution as well as accurate detection of pedestrians, animals, and the like is highly desirable. Consequently, when the vehicle is traveling on such a roadway, the control system controls the receiver and its horizontal scanning receiver antenna array into a wide scanning pattern with maximum resolution of the number of horizontal scan positions. Such a mode of the radar operation, furthermore, is able to detect even relatively small objects, such as small animals.

Simultaneously, the control system modifies the transmitter to transmit a repeating ramp which repeatedly scans between two fixed frequencies. Such a mode of operation for the transmitter increases the resolution of the radar system but also is less accurate in determining delta velocity between the vehicle itself and the detected objects. However, in an urban or neighborhood roadway, velocity detection or the delta velocity detection between the vehicle and such objects is much less important than on a multilane limited access roadway.

Lastly, in an urban or neighborhood environment, the control system preferably increases the power of the transmitter to ensure that small objects, such as pedestrians and animals, will produce an acceptable echo back to the antenna array.

Still other different types of roadways, such as a winding highway, will cause the control system to generate still different modes of operation for the radar system to provide optimal radar performance.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a block diagram view illustrating a preferred embodiment of the present invention;

FIG. 2 is a simplified flowchart illustrating a portion of the operation of the present invention;

FIG. 3 is a top plan view illustrating a vehicle on a multi-lane divided highway;

FIG. 4 is a transmission waveform used by the radar system on multilane or limited access roadways;

DETAILED DESCRIPTION OF A PREFERRED EMBODIMENT OF THE PRESENT INVENTION

Figure 5:
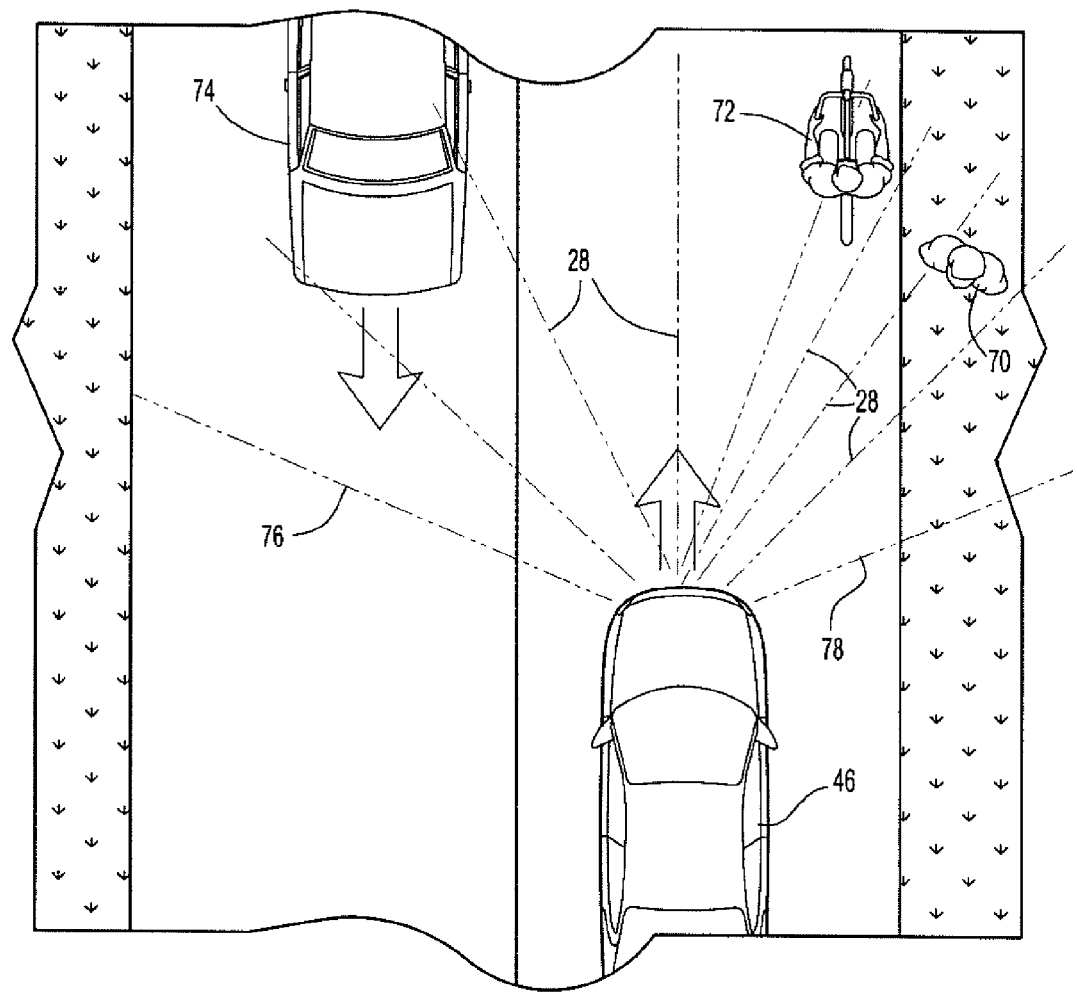
FIG. 5 is a top plan view illustrating the radar system on an urban or neighborhood roadway.

With reference first to FIG. 1, a preferred embodiment of a radar system 20 in accordance with the present invention is shown. The radar system is preferably a continuous wave frequency modulated (CWFM) radar system for use in an automotive vehicle. The radar system 20 thus preferably operates at a frequency of approximately 76.5 gigahertz, i.e. the frequency band allotted by the federal governmental for automotive radar applications.

The radar system 20 includes a transmitter 22 which transmits a microwave signal which repeatedly varies in frequency in a repeating waveform in the automotive radar band. The actual configuration of the waveform transmitted by the transmitter 22 will, however, vary in dependence upon the type of roadway currently traveled by the automotive vehicle as will be described.

Still referring to FIG. 1, the radar system 20 includes a microwave receiver 24 which receives an input signal from an antenna array 26. The antenna array 26 includes a predetermined number of horizontal scan positions 28 which are selected under the control of the receiver 24 and a control circuit 40. In the well-known fashion, the receiver 24 receives echoes of the transmitted microwave signal from the transmitter 22, if present, in the direction of the horizontal scan position 28 currently selected by the receiver 24. In the well-known fashion, the resolution of the received microwave signal by the receiver 24 increases with the number of horizontal scan positions 28 of the scanning receiver antenna array 26.

The receiver 24 generates an output signal on an output line 29 to a processor 30 which, under software control, generates an output signal to a collision avoidance system 32 in the event of a pending or potential collision. The collision avoidance system 32 may take any conventional form, such as an automatic braking system.

With reference now to FIG. 2, a simplified flowchart illustrating the operation of the processor 30 is shown. At step 34 the processor analyzes the signal from the receiver 24 to identify objects detected by the radar system 20 and their relative velocity relative to the vehicle 46. Step 34 then proceeds to step 36.

At step 36 the program determines if a collision is impending. If not, step 36 branches back to step 36 and the above process is repeated. Otherwise, step 36 branches to step 38 and activates the collision avoidance system 32.

With reference again to FIG. 1, the control circuit 40 is preferably microprocessor based and operates under the control of a programmed processor 30. The control circuit 40 also receives an input from a GPS system 42 indicative of the position of the radar system 20.

The GPS system 42 may be either self-contained with the radar system 20 or may be external to the radar system 20, e.g. a navigation system 44 for the vehicle 46. In either event, the GPS system 42 either includes or has access to map data and provides a signal to the control circuit 40 of the type of roadway currently traveled by the radar system 20 and thus currently traveled by the automotive vehicle 46.

Any conventional system may be employed to determine the type of roadway traveled by the radar system 20. For example, the map data from the navigation system 44 may have self-contained data indicative of the type of roadway currently traveled by the navigation system 44. Alternatively, the GPS system 42 or the control circuit 40 may determine the type of roadway from the map data.

There are many different types of roadways that may be traveled by the vehicle. For example, a divided multilane highway or limited access highway or expressway forms one type of roadway. An urban or neighborhood roadway forms another type of roadway while a two lane highway, parking lots, transition zones, and the like all form different types of roadways. The different types of roadways, furthermore, need different modes of operation of both the transmitter 22 and receiver 24 for optimal radar performance. For example, with reference to FIG. 3, in the event that the type of roadway is a multilane divided highway or a limited access divided highway, high resolution is not required since typically the only objects of interest to the radar system 20 would be relatively large automotive vehicles traveling in the same direction. Likewise, only information forwardly and to the right of the vehicle 46 for merging vehicles is of interest to the radar system 20.

In this situation, the control circuit 40 identifies the roadway as a divided highway limited access roadway from the input from the GPS system 42 and transmits control signals to the receiver 24 to limit the number of horizontal scan positions 28 of the radar system 20 to only a portion of the available horizontal scan positions 28 and only those positions facing forwardly to the vehicle 46, as shown at 48, and optionally to the right side of the vehicle 46 as shown by scan position 50.

With reference now to FIG. 4, the control circuit 40 also controls the operation of the transmitter 22 so that the transmitter 22 transmits a sawtooth waveform 52 followed by an elongated tail 54. An exemplary echo or reflected signal is also shown in FIG. 4 at 56. The echo 56 follows the same waveform generally as the transmitted waveform 52 but with a time shift representative of the time of flight between the radar system 20 and the detected object.

The frequency shift 58 between the transmitted waveform 52 and the echo 56 provides adequate range detection for the radar system 20, especially at long range of the type desirable for relatively high vehicle speed of the type expected on a multilane divided highway or limited access roadway. However, the delta speed detection between the radar system 20 and the detected object is relatively difficult to accurately determine during the ramp portion of the waveforms 52 and 56. However, the frequency shift 58 between the tail 54 of the transmitted signal and the tail 62 of the echo provides an easily detected and accurate delta velocity, i.e. difference in velocity between the radar system 20 and the detected object. The magnitude of the frequency shift 58, of course, varies as a function of delta velocity.

In operation, the transmitted sawtooth and tail waveform 52 and 54 are repeated during the operation of the radar system 20. Furthermore, one sawtooth waveform 52 and tail 54 is generated for each horizontal scan position 28 (FIG. 1) of the antenna array 26. Consequently, if, for example, the control circuit 40 limits the number of horizontal scan positions 28 to only 10 scan positions out of a total of, for example, 32 scan positions, 10 transmission waveforms 52 followed by the tail 54 would be performed for each complete horizontal scan, i.e. from the left front of the vehicle and to the right of the vehicle. This reduced number of horizontal scan positions 28 utilized by the receiver 24, however, is not only accurate, but optimal during high speed operation of the vehicle 46 on a multilane or limited access roadway. Furthermore, the lower resolution for the radar system 20 provided by the more limited number of horizontal scan positions 28 is adequate for use on multilane or limited access divided roadways since small objects, such as pedestrians, are rarely, if ever, encountered.

With reference now to FIG. 5, if the vehicle 46 is traveling in an urban or neighborhood roadway, or even in a parking lot roadway, the vehicle 46 typically travels at a slow speed, e.g. 40 miles per hour or less. While traveling on such a roadway, the vehicle 46 may very well encounter relatively small objects, such as a pedestrian 70, bicyclist 72, as well as oncoming vehicles 74. In this situation, for optimal radar performance, maximum resolution for the radar system is desired whereas the relative velocity difference between the vehicle 46 and the various objects 70-74 is less important if important at all.

Consequently, in this situation the control circuit 40 identifies the type of roadway from the GPS system 42 and generates output signals to the receiver 24 (FIG. 1) to utilize the maximum number of horizontal scan positions 28 available to the scanning radar antenna array 26. The horizontal scanning positions 28, furthermore, extend from the far left of the vehicle 46, as shown at 76, and to the far right side of the vehicle 46, as shown at 78, since the entire area not only in front but also to the left and right of the vehicle 46 is of importance to the radar system 20 and the vehicle 46.

Figure 6:
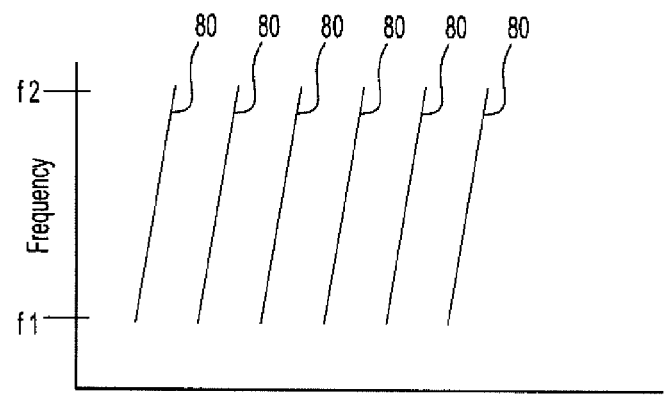
FIG. 6 is a view similar to FIG. 4, but illustrating the transmission waveform on an urban or neighborhood roadway.

With reference now to FIG. 6, the control circuit 40 also controls the operation of the transmitter 22 so that the transmitter 22 transmits repeating ramps 80 which sweep between frequency F1 and frequency F2 in the microwave band. In operation, one ramp 80 is used for one horizontal scan position 28 of the antenna array 26, the next ramp 80 is used for the next horizontal scan position 28 of the antenna array 26, and so forth. Consequently, if the antenna array contains, for example, 32 horizontal scan positions 28, 32 frequency ramps 80 will be necessary for a complete horizontal sweep of the antenna array 26. However, the operation of the radar system 20 is still adequately fast since the tail 54 and 62 (FIG. 4) used for high speed operation of the vehicle 46 is unnecessary since delta velocity between the vehicle 46 and the objects 70-74 is relatively unimportant in an urban or neighborhood roadway.

It is well known that relatively small soft objects, such as pedestrians and animals, reflect relatively low power density back to the radar system 20. Consequently, in order to further optimize the operation of the radar system 20 in an urban, neighborhood, or parking lot roadway, the control circuit 40 also preferably increases the power of the transmitter 22 to increase the reflection or echo 56 from the pedestrian and ensure detection by the radar system 20.

It will be understood, of course, that the exemplary roadways thus far described are by way of example only and that other roadways of different types may also require special operation of the radar system 20 in order to optimize operation of the radar system 20. For example, a winding two lane road may utilize a radar resolution somewhere in between a limited access roadway and an urban roadway. Thus, a number of horizontal scan positions 28 of the antenna array 26 would be employed in between the number used for a limited access roadway and an urban roadway. Similarly, in such a situation, the radar beam may be evenly distributed on the left side and right side of the vehicle 46.

Figure 7:
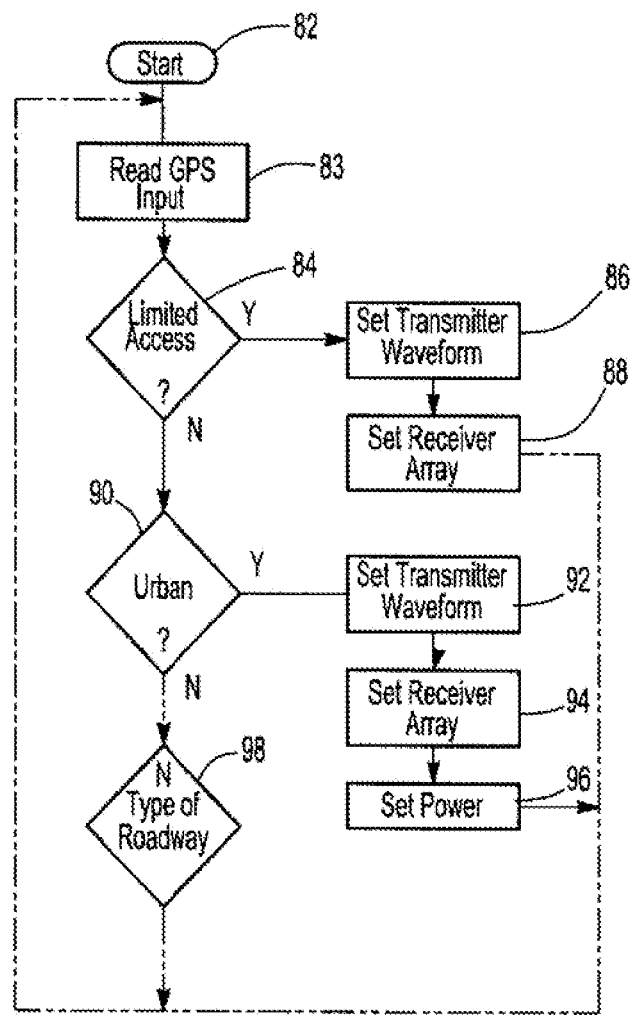
FIG. 7 is a flowchart illustrating the exemplary operation of the present invention.

With reference now to FIG. 7, a simplified flowchart is shown illustrating the operation of the radar system 20 of the present invention and, particularly, the operation of the processor 30 in the control circuit 40. After initiation at step 82, step 82 proceeds to step 83 and reads the input signal from the GPS system 42. This input signal from the GPS system 42 may include self-contained data indicative of the type of roadway or step 83 may analyze the GPS data to determine the type of roadway. Step 83 then proceeds to step 84.

At step 84, the control circuit 40 determines if the vehicle 46, and thus the radar system 20, is on a multilane divided highway or limited access roadway. If so, step 84 branches to step 86 and sets the transmitter 22 to the waveform 52 illustrated in FIG. 4. This ensures not only long range operation of the radar system 20, but also accurate measurement of the delta velocity between the vehicle 46 and detected objects. Step 86 then branches to step 88.

At step 88, the control circuit 40 sets the operation of the receiver 24 to have only a limited number of horizontal scan positions 28 and, optionally, scan positions 28 only forwardly, slightly left, and to the right of the vehicle 46. Although this reduces the overall resolution of the radar system 20, such resolution is acceptable for use on multilane divided highways or limited access roadways. Step 88 then branches back to step 83 where the above process is repeated.

Conversely, if the vehicle 46 is not on a limited access roadway, step 84 instead branches to step 90. At step 90, the control circuit 40 determines if the vehicle 46 is on an urban roadway. If so, step 90 branches to step 92 where the control circuit 40 sets the radar waveform to the waveform illustrated in FIG. 6. This waveform ensures high resolution at relatively slow speeds for the vehicle 46 and where delta velocity between the vehicle 46 and detected objects is less important. Step 92 then branches to step 94.

At step 94, the control circuit 40 sets the antenna array 26 to scan for the maximum number of horizontal scan positions 28 thus achieving the maximum resolution for the radar system 20 from the left side of the vehicle 46 and to the right side of the vehicle 46. Such high resolution is desirable in an urban roadway, parking lots, and neighborhood roadways where pedestrians, bicyclists, animals, and the like may be encountered. Step 94 then proceeds to step 96.

At step 96, the control circuit 40 increases the power of the transmitter 22 to improve the detection of objects such as animals and pedestrians.

If the roadway is not an urban roadway, step 90 then proceeds to identify other types of roadways at steps 98 and to set the parameters of both the transmitter 22 and receiver 24 and its antenna array 26 to achieve optimal performance for that particular type of roadway.

From the foregoing, it can be seen that the present invention provides an adaptive radar system which controls the operation of the transmitter as well as the receiver and its antenna array to achieve optimal performance automatically as a function of the type of roadway currently traveled by the vehicle. Having described our invention, however, many modifications thereto will become apparent to those skilled in the art to which it pertains without deviation from the spirit of the invention as defined by the scope of the appended claims.

We claim:

1. An automotive radar system comprising:
    a GPS system which generates an output signal representative of the type of roadway,
    a transmitter which transmits a microwave radio signal,
    a horizontally scanning receiver antenna array,
    a receiver coupled to said horizontally scanning receiver antenna array which receives an echo, if present, from the radio signal transmitted by said transmitter and generates an output signal representative of the echo,
    a control circuit which receives said output signal from said antenna array and the output signal from the GPS system linked with a map database indicative of the type of roadway currently traveled by the automotive radar system, said control circuit varying the mode of operation of said receiver or said transmitter as a function of the type of roadway from the GPS system.

2. The radar system of claim 1 wherein said control circuit varies the transmitter power as a function of the type of roadway.

3. The radar system of claim 2 wherein said control circuit increases the transmitter power when the roadway type is an urban road.

4. The radar system of claim 2 wherein said control circuit decreases transmitter power when the roadway type is a limited access highway.

5. The radar system of claim 1 wherein said control circuit varies the waveform of the microwave radio signal as a function of the type of roadway.

6. The radar system of claim 5 wherein said control circuit controls said transmitter to transmit a sawtooth waveform when the roadway type is a limited access highway.

7. The radar system of claim 5 wherein said control circuit controls said transmitter to transmit a repeating ramp waveform when the roadway type is an urban road.

8. The radar system of claim 1 wherein said antenna array receives echoes at a plurality of horizontal scan positions during a complete horizontal scan of the antenna array and wherein said control circuit varies the number of horizontal scan positions per complete receiver horizontal scan as a function of the type of roadway.

9. The radar system of claim 8 wherein said control circuit utilizes only a portion of the number of scan positions per complete horizontal scan when the roadway type is a limited access highway.

10. The radar system of claim 8 wherein said control circuit utilizes substantially all of the number of scan positions per complete horizontal scan when the roadway type is an urban road.

11. The radar system of claim 1 wherein said antenna array receives echoes at a plurality of horizontal scan positions during a complete horizontal scan of the antenna array and wherein said control circuit varies the selection of horizontal scan positions per complete receiver horizontal scan as a function of the type of roadway.

12. The radar system of claim 11 wherein said control circuit utilizes only scan positions directed forwardly and to one side per complete horizontal scan when the roadway type is a limited access highway.

13. The radar system of claim 1 wherein said control circuit varies the period of a complete horizontal scan of the receiver.

14. The radar system of claim 1 wherein the GPS system is contained in a navigation system of the automotive vehicle.

15. The radar system of claim 1 wherein said radar system is a continuous wave frequency modulated system.

* * * * *